UNITED STATES PATENT OFFICE.

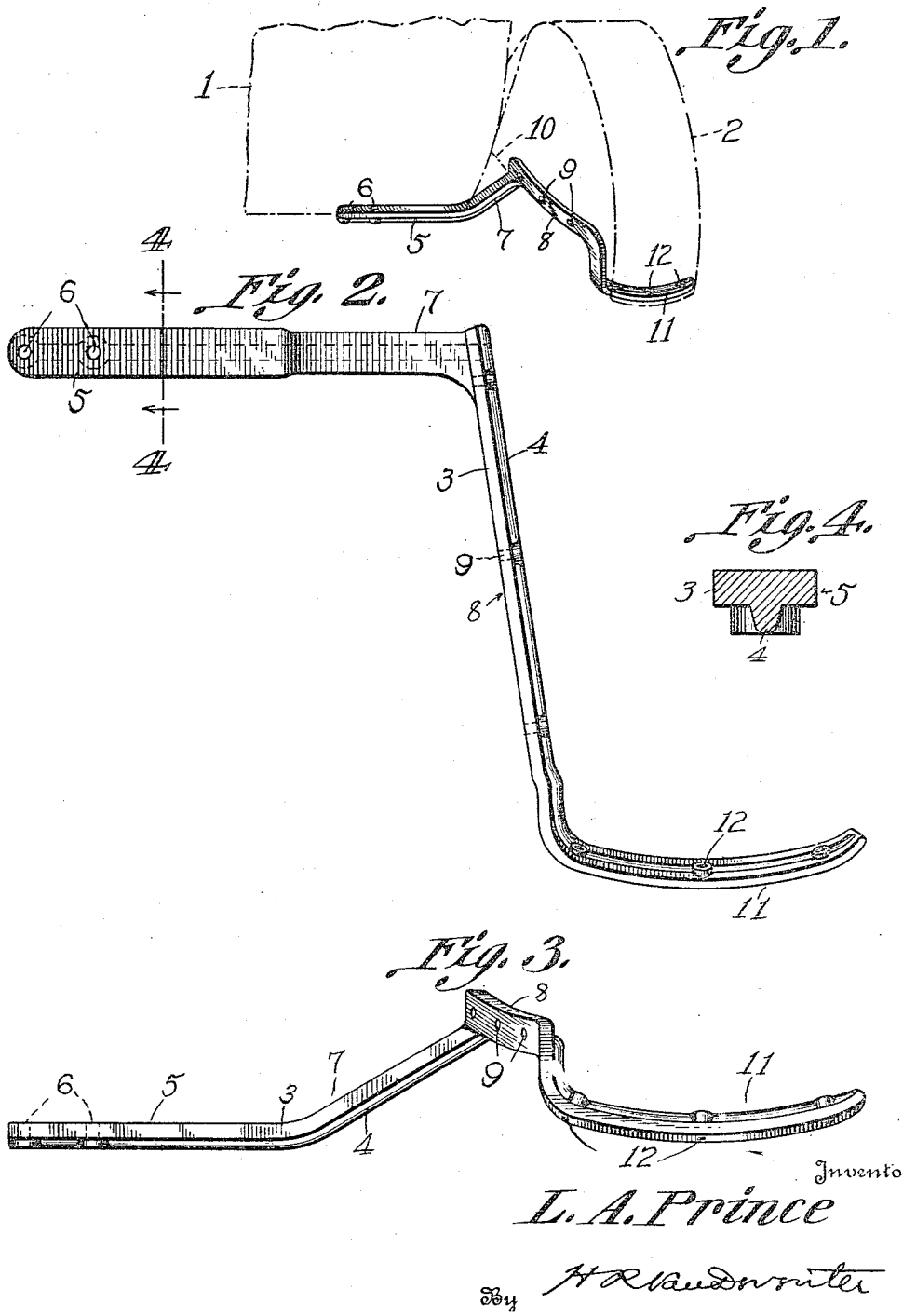

LOUIS ARTHUR PRINCE, OF SUMTER, SOUTH CAROLINA.

FENDER-BRACE.

1,267,589.  Specification of Letters Patent.  Patented May 28, 1918.

Application filed October 4, 1917. Serial No. 194,690.

*To all whom it may concern:*

Be it known that I, LOUIS ARTHUR PRINCE, a citizen of the United States, residing at Sumter, in the county of Sumter and State of South Carolina, have invented certain new and useful Improvements in Fender-Braces, of which the following is a specification, reference being had to the accompanying drawing.

The subject of this invention is a brace for the rear fenders of an automobile, and the objects of the invention are, first, to provide means for supporting the rear fender of an automobile, second, to prevent vibration of the fender, third, to provide a brace which will be practically hidden from view, fourth, to provide a simple and efficient brace.

With the foregoing and such other objects in view as may appear as the description proceeds, the invention consists in the novel construction and arrangement of parts set forth in the following specification, more particularly pointed out in the claims, and which are shown in the accompanying drawing, wherein:—

Figure 1 is a perspective view of the device applied to an automobile, a fragmentary portion of which is shown;

Fig. 2 is a plan view;

Fig. 3 is a side elevation;

Fig. 4 is a cross section on the line 4—4 of Fig. 2.

Referring to the drawing by numerals of reference:—

The body of an automobile is indicated at 1 and the rear fenders at 2.

The brace is preferably formed of a rectangular bar 3 formed with a central longitudinal rib 4 on one face thereof. This bar is formed to provide a flat portion 5 which is provided with aperture 6 for the reception of screws or bolts for the purpose of attachment to the bottom of an automobile body, or chassis as shown.

The portion 5 merges into an upwardly extending portion 7 from the outer end of which extends laterally a portion 8 provided with apertures 9 for the reception of rivets or the like by which said portion is attached to the curtain 10 of the fender.

The portion or member 8 merges into an angularly disposed, curved finger 11 which is provided with apertures 12 for the reception of rivets or other fastening means. The finger 11 is curved to conform to the curve of the fender 2, to the inner face of the rear end of which it is attached.

As will be readily understood, this brace holds the fender curtain and also the rear end of the fender proper, and prevents all undue vibration of the same.

Having thus described the invention, what is claimed as new and sought by Letters Patent, is:—

1. In an automobile, the combination with an automobile fender curtain, the lower edge of which is free with respect to the frame members of the automobile, of means for preventing the vibration of said fender curtain comprising a bar having a flat portion attached to the bottom of the automobile body, and an angularly disposed portion secured to the lower edge of the fender curtain.

2. In an automobile, the combination with a fender and curtain, the rear lower edge of the fender and the lower edge of the curtain being approximately at right angles to each other, and both of said edges being free with respect to the frame members of the automobile, of means for preventing the vibration of said fender and curtain comprising a bar having a flat portion attached to the bottom of the automobile body and an angularly disposed portion secured to the lower edges of the fender and curtain.

In testimony whereof I hereunto affix my signature in the presence of two witnesses.

LOUIS ARTHUR PRINCE.

Witnesses:
A. L. SHAW,
DORA SMITH.